US009046363B2

(12) United States Patent
Heege

(10) Patent No.: US 9,046,363 B2
(45) Date of Patent: Jun. 2, 2015

(54) USING MULTISPECTRAL SATELLITE DATA TO DETERMINE LITTORAL WATER DEPTHS DESPITE VARYING WATER TURBIDITY

(75) Inventor: Thomas Heege, Wessling (DE)

(73) Assignee: SATOP GmbH, Seefeld (DE)

( * ) Notice: Subject to any disclaimer, the term of this patent is extended or adjusted under 35 U.S.C. 154(b) by 324 days.

(21) Appl. No.: 13/457,918

(22) Filed: Apr. 27, 2012

(65) Prior Publication Data
US 2013/0286377 A1  Oct. 31, 2013

(51) Int. Cl.
| | |
|---|---|
| G01C 3/08 | (2006.01) |
| G01C 13/00 | (2006.01) |
| G01S 17/46 | (2006.01) |
| G01S 11/14 | (2006.01) |
| G06K 9/00 | (2006.01) |
| G06K 9/46 | (2006.01) |

(52) U.S. Cl.
CPC ............ *G01C 13/008* (2013.01); *G06K 9/0063* (2013.01); *G01S 17/46* (2013.01); *G01S 11/14* (2013.01); *G06K 2009/4657* (2013.01)

(58) Field of Classification Search
CPC ........... G01C 3/08; G01S 11/12; G01S 17/08; G01S 17/89; G01B 11/026
USPC ......... 356/3.01, 4.01, 4.07, 5.01, 5.09, 9, 625
See application file for complete search history.

(56) References Cited

U.S. PATENT DOCUMENTS

| | | | | |
|---|---|---|---|---|
| 5,412,474 | A * | 5/1995 | Reasenberg et al. | 356/486 |
| 6,057,909 | A * | 5/2000 | Yahav et al. | 356/5.04 |
| 6,868,285 | B2 * | 3/2005 | Muller-Dethlefs | 600/317 |
| 7,369,229 | B2 * | 5/2008 | Bissett et al. | 356/328 |
| 2011/0285984 | A1 * | 11/2011 | Christian et al. | 356/28.5 |

OTHER PUBLICATIONS

Albert et al., "An analytical model for subsurface irradiance and remote sensing reflectance in deep and shallow case-2 waters," Optical Society of America, vol. 11, No. 22 Optics Express Nov. 3, 2003 pp. 2873-2890 (18 pages).

(Continued)

*Primary Examiner* — Isam Alsomiri
*Assistant Examiner* — Samantha K Abraham
(74) *Attorney, Agent, or Firm* — Imperium Patent Works; Darien K. Wallace

(57) ABSTRACT

Satellite data is used to determine water depth by accounting for the changing turbidity of the water over time and without requiring calibration using SONAR measurements. Radiance values at multiple wavelengths sensed at both a first time and a second time are stored in a database. Modeled reflectance values are calculated for a defined surface area on the water based on an assumed depth, assumed water constituents and assumed bottom cover. A plurality of differences between the modeled reflectance values and the reflectances sensed at the two times are calculated. A bathymetry application module minimizes the sum of the differences between the modeled and sensed subsurface reflectances by varying the assumed depth, bottom cover and water constituents. The differences are weighted based on wavelength before being summed. The depth that results in the minimized sum of the differences is the estimated depth, which is displayed on a graphical user interface.

17 Claims, 9 Drawing Sheets

(56) References Cited

OTHER PUBLICATIONS

Heege et al., "Mapping of water constituents in Lake Constance using multispectral airborne scanner data and a physically based processing scheme," Canadian Journal of Remote Sensing, vol. 30, Issue 1 (2004) pp. 77-86 (11 pages).

Ohlendorf et al., "Bathymetry mapping and sea floor classification using multispectral satellite data and standardized physics-based data processing," Proceedings of the SPIE (Society of Photographic Instrumentation Engineers) vol. 8175, 817503 (2011) (9 pages).

* cited by examiner $$R_{IRR} = R_\infty \left(1 - A_1^{-z(a+b)\left[\frac{K_0}{\cos\theta} + (1+\frac{b}{a+b})K_{1W}(1+\frac{K_{2W}}{\cos\theta})\right]}\right) + A_2 \cdot R_B^{-z(a+b)\left[\frac{K_0}{\cos\theta} + (1+\frac{b}{a+b})K_{1B}(1+\frac{K_{2B}}{\cos\theta})\right]} \quad (62)$$

$$R_{IRR} = R_\infty \left(1 - e^{-2Kz}\right) + R_B e^{-2Kz} \quad (63)$$

| | Satellite scenes acquired at first time | | | | | | | |
|---|---|---|---|---|---|---|---|---|
| Spectral band number | 1 | 2 | 3 | 4 | 5 | 6 | 7 | 8 |
| Wavelength [nm] | 442.27 | 489.67 | 509.62 | 559.49 | 619.37 | 660.56 | 708.08 | 864.61 |
| Radiance at sensor | 63.0900 | 70.6800 | 64.5400 | 51.2100 | 25.3150 | 18.8250 | 15.7050 | 7.1340 |
| Adjacency corrected radiance | 81.2200 | 68.8600 | 62.8000 | 49.5200 | 25.0080 | 17.8400 | 14.9600 | 6.6540 |
| Sunglitter corrected radiance | 81.1700 | 68.8000 | 62.7400 | 49.4550 | 24.9450 | 17.7800 | 14.9050 | 6.6100 |
| Sensed Subsurface Reflection (R_sub) | 0.087014 | 0.103327 | 0.099993 | 0.103748 | 0.027205 | 0.017412 | 0.016507 | 0.000993 |
| Absorption Pure Water | 0.010623 | 0.018042 | 0.032544 | 0.066854 | 0.280292 | 0.434003 | 0.706375 | 4.604292 |
| Specific absorption total suspended matter | 0.000000 | 0.000000 | 0.000000 | 0.000000 | 0.000000 | 0.000000 | 0.000000 | 0.000000 |
| Specific absorption gelbstoff | 0.969504 | 0.499339 | 0.377857 | 0.187868 | 0.081247 | 0.034484 | 0.023471 | 0.002629 |
| Specific absorption phytoplankton | 0.022081 | 0.016362 | 0.013512 | 0.009130 | 0.006673 | 0.012594 | 0.004325 | 0.000000 |
| Total Absorption (a) | 0.072830 | 0.058495 | 0.064142 | 0.086140 | 0.292739 | 0.453929 | 0.713567 | 4.604371 |
| Backscattering Pure Water | 0.001704 | 0.001117 | 0.000959 | 0.000630 | 0.000440 | 0.000293 | 0.000247 | 0.000104 |
| Specific backscattering total suspended matter | 0.013038 | 0.012333 | 0.012114 | 0.011704 | 0.011382 | 0.011179 | 0.011124 | 0.010960 |
| Specific backscattering gelbstoff | 0.000000 | 0.000000 | 0.000000 | 0.000000 | 0.000000 | 0.000000 | 0.000000 | 0.000000 |
| Specific backscattering phytoplankton | 0.000000 | 0.000000 | 0.000000 | 0.000000 | 0.000000 | 0.000000 | 0.000000 | 0.000000 |
| Total Backscattering (b) | 0.014742 | 0.01345 | 0.013073 | 0.012334 | 0.011822 | 0.011472 | 0.011371 | 0.011064 |
| R_inf = 0.33 * b/(a+b) | 0.055553 | 0.061693 | 0.055871 | 0.041333 | 0.012809 | 0.008134 | 0.005176 | 0.000791 |
| Extinction K = sqrt(a * (a+2*b)) | 0.088322 | 0.070677 | 0.076100 | 0.087689 | 0.304331 | 0.465259 | 0.724848 | 4.615422 |
| Bottom cover type 1 | 0.0982 | 0.1298 | 0.1437 | 0.1793 | 0.1370 | 0.1163 | 0.1182 | 0.1247 |
| Bottom cover type 2 | 0.0239 | 0.0301 | 0.0370 | 0.0845 | 0.0501 | 0.0309 | 0.0898 | 0.5000 |
| Bottom cover type N | | | | | | | | |
| Scatterer, e.g., total suspended matter | 1.00 | | | | | | | |
| Absorber, e.g., gelbstoff | 0.03 | | | | | | | |
| Absorber, e.g., phytoplankton | 1.50 | | | | | | | |
| Modeled bottom reflectance (R_bot) | 0.08334 | 0.10986 | 0.12236 | 0.15634 | 0.119962 | 0.09822 | 0.11092 | 0.19976 |
| z = assumed water depth | 2.50 | | | | | | | |
| Modeled R_irr = R_inf*(1-e(-2*K*z)) + R_bot*e(-2*K*z) | 0.073600 | 0.095521 | 0.101316 | 0.111896 | 0.036132 | 0.017030 | 0.007986 | 0.000791 |
| Sensed Subsurface Reflection (R_irr) | 0.087014 | 0.103327 | 0.099993 | 0.103748 | 0.027205 | 0.017412 | 0.016507 | 0.000993 |
| Reliability weight of spectral band | 1.0 | 1.0 | 1.0 | 1.0 | 1.0 | 0.5 | 0.5 | 0.0 |
| Sum of reliability weights (for normalizing weights) | 6.0 | | | | | | | |
| Number of Weights not equal zero | 7.0 | | | | | | | |
| Difference between modeled and sensed R_irr | 0.191640 | 0.118657 | 0.018922 | 0.115394 | 0.127525 | 0.002734 | 0.080793 | 0.0 |
| Sum of differences modeled vs sensed R_irr | 0.093952 | | | | | | | |

FIG. 9

| Satellite scenes acquired at second time | | | | | | | | |
|---|---|---|---|---|---|---|---|---|
| Spectral band number | 1 | 2 | 3 | 4 | 5 | 6 | 7 | 8 |
| Wavelength [nm] | 442.27 | 489.67 | 509.62 | 559.49 | 619.37 | 680.56 | 708.06 | 864.61 |
| Radiance at sensor | 74.3300 | 65.5900 | 61.0500 | 50.1450 | 24.8200 | 17.6300 | 14.4800 | 6.8520 |
| Adjacency corrected radiance | 73.2800 | 64.5100 | 60.0100 | 49.1100 | 23.9600 | 16.9700 | 13.9650 | 6.5140 |
| Sunglitter corrected radiance | 68.2300 | 58.3200 | 53.4900 | 42.5400 | 17.5100 | 10.7200 | 8.4150 | 2.0960 |
| Sensed Subsurface Reflection (R_sub) | 0.087416 | 0.103274 | 0.101205 | 0.104190 | 0.028458 | 0.016820 | 0.014695 | 0.000896 |
| Absorption Pure Water | 0.010623 | 0.018042 | 0.032544 | 0.066854 | 0.280292 | 0.434003 | 0.706375 | 4.804292 |
| Specific absorption total suspended matter | 0.000000 | 0.000000 | 0.000000 | 0.000000 | 0.000000 | 0.000000 | 0.000000 | 0.000000 |
| Specific absorption gelbstoff | 0.969504 | 0.499339 | 0.377657 | 0.187868 | 0.061247 | 0.034484 | 0.023471 | 0.002629 |
| Specific absorption phytoplankton | 0.022081 | 0.016982 | 0.013512 | 0.009100 | 0.086673 | 0.012594 | 0.004325 | 0.000000 |
| Total Absorption (a) | 0.079454 | 0.063590 | 0.068195 | 0.088670 | 0.294741 | 0.457707 | 0.714864 | 4.804371 |
| Backscattering Pure Water | 0.001704 | 0.001117 | 0.000859 | 0.000630 | 0.000440 | 0.000293 | 0.000247 | 0.000104 |
| Specific backscattering total suspended matter | 0.013038 | 0.012333 | 0.012114 | 0.011704 | 0.011382 | 0.011179 | 0.011124 | 0.010960 |
| Specific backscattering gelbstoff | 0.000000 | 0.000000 | 0.000000 | 0.000000 | 0.000000 | 0.000000 | 0.000000 | 0.000000 |
| Specific backscattering phytoplankton | 0.000000 | 0.000000 | 0.000000 | 0.000000 | 0.000000 | 0.000000 | 0.000000 | 0.000000 |
| Total Backscattering (b) | 0.0173496 | 0.0159166 | 0.0154958 | 0.0146748 | 0.0140964 | 0.0137078 | 0.0135958 | 0.013256 |
| R_inf = 0.33 * b/(a+b) | 0.059144 | 0.065064 | 0.061101 | 0.046789 | 0.015064 | 0.009596 | 0.006159 | 0.000947 |
| Extinction K = sqrt(a * (a+2*b)) | 0.095236 | 0.077897 | 0.082244 | 0.102500 | 0.308517 | 0.471215 | 0.728333 | 4.617608 |
| Bottom cover type 1 | 80% | 0.0982 | 0.1298 | 0.1437 | 0.1793 | 0.137 | 0.1163 | 0.1162 | 0.1247 |
| Bottom cover type 2 | 20% | 0.0239 | 0.0301 | 0.037 | 0.0645 | 0.0501 | 0.0309 | 0.0898 | 0.5 |
| Bottom cover type N | 0% | | | | | | | | |
| Scatterer, e.g., total suspended matter | 1.20 | | | | | | | | |
| Absorber, e.g., gelbstoff | 0.03 | | | | | | | | |
| Absorber, e.g., phytoplankton | 1.80 | | | | | | | | |
| Modeled bottom reflectance (R_bot) | | 0.08334 | 0.10986 | 0.12236 | 0.15634 | 0.11982 | 0.09922 | 0.11092 | 0.19976 |
| z = assumed water depth | 2.50 | | | | | | | | |
| Modeled R_irr = R_inf*(1-e^(-2*K*z)) + R_bot*e(-2*K*z) | | 0.074173 | 0.095732 | 0.101706 | 0.112402 | 0.037421 | 0.018091 | 0.008905 | 0.000947 |
| Sensed Subsurface Reflection (R_irr) | | 0.087416 | 0.103274 | 0.101205 | 0.104190 | 0.028458 | 0.016820 | 0.014695 | 0.000896 |
| Reliability weight of spectral band | | 1.0 | 1.0 | 1.0 | 1.0 | 1.0 | 0.5 | 0.5 | 0.0 |
| Sum of reliability weights (for normalizing weights) | 6.0 | | | | | | | | |
| Number of Weights not equal zero | 7.0 | | | | | | | | |
| Difference between modeled and sensed R_irr | | 0.189176 | 0.107749 | 0.007157 | 0.117310 | 0.128052 | 0.009080 | 0.041362 | 0.000000 |
| Sum of differences modeled vs sensed R_irr | 0.085698 | | | | | | | | |

FIG. 10

USING MULTISPECTRAL SATELLITE DATA TO DETERMINE LITTORAL WATER DEPTHS DESPITE VARYING WATER TURBIDITY

TECHNICAL FIELD

The present invention relates generally to bathymetry and more specifically to a system for determining water depth using multispectral satellite data.

REFERENCE TO ASCII TEXT FILE APPENDIX

This application includes an ASCII text file appendix containing source code to software that embodies the inventions described herein. The software code is algorithmic structure of a means for determining water depth using radiance from the water surface based on the turbidity of the water at a first time and at a second time. The source code is in ASCII format. A portion of the disclosure of this patent document contains material that is subject to copyright protection. All the material on the ASCII text file appendix is hereby expressly incorporated by reference into the present application. The copyright owner of that material has no objection to the facsimile reproduction by anyone of the patent document or the patent disclosure, as it appears in the Patent and Trademark Office patent files or records, but otherwise reserves all copyright rights. The ASCII text file appendix includes one text file readable in the MS-Windows operating system. The file is named "Method34code.txt", is seven kilobytes large and was created on Apr. 26, 2012.

BACKGROUND

Accurately determining water depth is a crucial aspect of navigating littoral waters. The measurement of water depths, also known as bathymetry, is also useful in oil and gas exploration, pipeline and cable laying, recreational water activities and in environmental fields, such as in the study of marine ecosystems and the effects of climate change. Historically, nautical charts for maritime transportation were prepared by simply looking into the water or by lowering a weight on a rope into the water and then noting the rope length when the weight no longer pulled on the rope. More recently, echo sounding has been used to determine the depth of the sea floor by measuring the time for a SONAR (SOund NAvigation and Ranging) signal to travel to the sea floor, bounce off and return to the hydrographic survey ship above. In addition to SONAR, which uses sound waves, LIDAR (LIght Detection And Ranging) is also used for bathymetry mapping. However, performing bathymetric surveys using ships is quite expensive and time consuming. In addition, storms, currents and erosion change the underwater topography, so nautical charts must be updated. The amount of global littoral waters is simply too extensive to be surveyed on a regular basis. In some remote areas, the most recent nautical charts are hundreds of years old.

Attempts have been made to use earth observation sensors on satellites to perform bathymetry. The satellite measures radiation from the sun that is reflected from the earth. Water depth can be determined if the reflection of the sea bottom contributes a detectable part to the radiation measured by the sensor. Radiation at multiple wavelengths that emanates from a point on the water surface is measured at the satellite. Then an attempt is made to determine the water depth based on isolating the bottom reflection from other factors that scatter and absorb the sun's radiation, such as atmospheric molecules, pure water, substances in the water, the type of bottom surface, and the water surface roughness. Because these other factors change over time and over different coastal areas, previous attempts to determine an accurate depth at each survey location have failed. Only the relative depths in a small area have been reliably determined. For example, as the turbidity of the water gradually changes with location, existing bathymetric methods using satellite data show a change in depth even where the sea floor is flat. Likewise, existing methods can indicate that the depth at two locations is the same even where the actual depths are different because the water at the two locations exhibits differing turbidities.

A method is sought that uses satellite data to determine accurate water depths despite the effects of water turbidities that vary over time and location.

SUMMARY

The water depth is determined by taking into account the changing turbidity of the water over time and without requiring calibration with SONAR measurements. A method for determining water depth using satellite data involves minimizing the sum of differences between modeled subsurface reflectances on the one hand and subsurface reflectances sensed at both a first time and at a second time on the other hand. Radiance values at multiple wavelengths are sensed from a defined surface area on the water at both the first time and the second time and are stored in a database. Modeled reflectance values are calculated for a defined surface area on the water based on an assumed depth, assumed bottom cover and on assumed water constituents. A plurality of differences between the modeled reflectance values and the reflectances sensed at the two times are calculated. A bathymetry software module minimizes the sum of the differences by varying the assumed depth, the reflectance of the assumed bottom cover and the absorption and backscattering of the assumed water constituents. The depth that results in the minimized sum of the differences is the estimated depth and is displayed on a graphical user interface.

In another embodiment, a bathymetry method minimizes the sum of differences between modeled light intensity values on the one hand and first and second light intensity values on the other hand acquired at a first time and at a second time. A bathymetry software application stores a first light intensity value indicative of a radiance at a first wavelength emanating from a surface area of a body of water at the first time. The application stores a second light intensity value indicative of the radiance at the first wavelength emanating from the surface area of the body of water at the second time.

A plurality of modeled light intensity values at the first wavelength are calculated that indicate the radiance at the first wavelength emanating from the surface area of the body of water. Each of the plurality of modeled light intensity values depends on an assumed depth between the surface area and the bottom, on an assumed bottom cover on the bottom below the surface area that reflects radiation, and on assumed water constituents that absorb and scatter radiation. A plurality of first differences are determined between the first light intensity value and each of the plurality of modeled light intensity values based on the assumed depth, bottom cover and water constituents. In addition, a plurality of second differences are determined between the second light intensity value and each of the plurality of modeled light intensity values based on the assumed depth, bottom cover and water constituents. A deviation among the plurality of first differences and the plurality of second differences is minimized by varying the assumed depth, the assumed bottom cover and the assumed water constituents. The estimated depth between the surface area and the bottom is the assumed depth that results in the minimized deviation among the plurality of first differences and the plurality of second differences. The estimated depth is displayed on a graphical user interface.

A system for determining water depth includes a satellite database, a data analysis server and a graphical user interface. The system determines the water depth below a defined surface area of a body of water using light intensity values acquired by satellite sensors from the defined surface area at a first time and at a second time. The system determines the depth based on a first value indicative of the turbidity below the defined surface area at the first time and on a second value indicative of the turbidity below the defined surface area at the second time. The satellite database contains first light intensity values acquired over a plurality of wavelengths and second light intensity values acquired over the plurality of wavelengths. The first light intensity values are acquired at the first time, and the second light intensity values are acquired at the second time. The first and second light intensity values are all associated with the defined surface area.

The data analysis server calculates modeled light intensity values at the plurality of wavelengths. Each of the modeled light intensity values is associated with the defined surface area and depends on (i) the reflectance by an assumed bottom cover on the bottom below the defined surface area, (ii) the absorption and scattering resulting from assumed water constituents, and (iii) an assumed depth between the defined surface area and the bottom. For each of the plurality of wavelengths, the data analysis server determines a plurality of differences between the modeled light intensity values on the one hand and the first and second light intensity values on the other hand and minimizes the sum of the plurality of differences by varying the assumed depth, the reflectance of the assumed bottom cover, and the absorption and scattering of the assumed water constituents. The estimated depth between the defined surface area and the bottom is displayed on the graphical user interface. The estimated depth is the assumed depth that results in the minimized sum of the plurality of differences.

In yet another embodiment, a method included a step for storing light intensity values and a step for determining water depth below a surface area on a body of water. The method stores light intensity values that are acquired by a satellite sensor at a plurality of wavelengths. Each light intensity value is associated with a surface area on the body of water. The step for determining the depth uses the light intensity values based on a first value indicative of the turbidity below the surface area at a first time and on a second value indicative of the turbidity below the surface area at a second time. Examples of values indicative of turbidity are the concentration of particles below the surface area, the absorption of particles below the surface area, and the scattering of particles below the surface area. The method accurately determines the depth without calibrating the estimated depth using values acquired with SONAR.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 9 is a table of sample calculations performed using the equation of FIG. 8 to compare modeled subsurface reflectance to subsurface reflectance sensed at a first time.

FIG. 10 is a table of sample calculations performed using the equation of FIG. 8 to compare modeled subsurface reflectance to subsurface reflectance sensed at a second time.

DETAILED DESCRIPTION

Reference will now be made in detail to some embodiments of the invention, examples of which are illustrated in the accompanying drawings.

Figure 1:
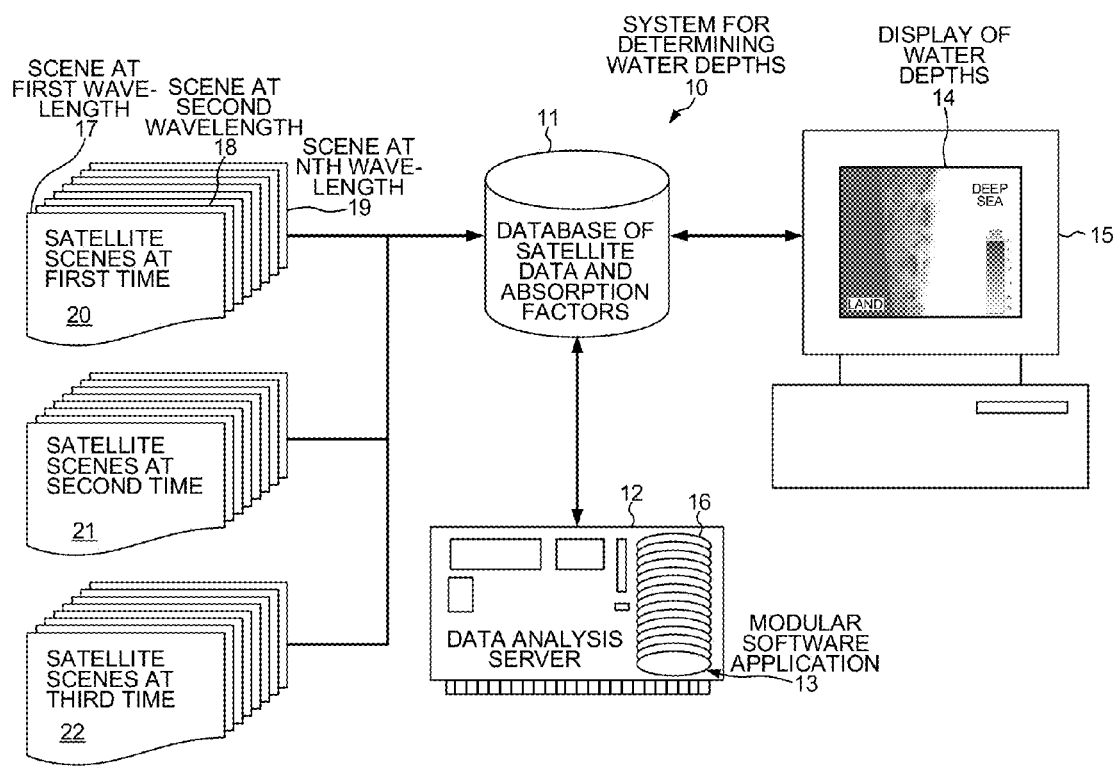
FIG. 1 is a diagram of a system for determining water depths using satellite data that includes a data analysis server.

FIG. 1 shows a bathymetric system 10 for determining littoral water depths using multispectral satellite data. Bathymetric system 10 includes a database of satellite data 11, a data analysis server 12, a modular software application 13 and a graphical user interface 14. In one embodiment, graphical user interface 14 is the screen of a personal computer 15. Modular software application 13 executes on a processor and is stored on a computer-readable medium, such as the hard drive 16 of data analysis server 12. One of the modules of modular software application 13 is a bathymetry application module.

Database 11 contains scenes of the surface of bodies of water in coastal areas of oceans, seas and lakes. Each scene is acquired at a different wavelength. In one embodiment, multiple satellite scenes are acquired within a range from 440 nanometers to 750 nanometers. Other satellite sensors, for example, acquire data over a range of 400 nm to 950 nm. Each pixel of a scene corresponds to a defined area on the surface of the body of water, such as a 2 meter by 2 meter area. Each scene is a matrix of pixels together with a light intensity value associated with each pixel. A satellite scene differs from a digital satellite image in that the scene does not associate each pixel with the wavelength of maximum intensity so as to create a color picture. Instead, each pixel in a satellite scene is associated with the intensity of a single wavelength (or narrow band centered on the wavelength) of light emanating from the corresponding defined area on the surface of the water. For example, a first scene 17 is acquired at a first wavelength, a second scene 18 is acquired at a second wavelength, and an nth scene 19 is acquired at an nth wavelength. The light intensity sensed by the satellite for each defined area can be indicated as the radiance, the reflectance or the irradiance. The radiance value is indicated as milliwatts/steradian/$m^2$/nm, where the nanometer value is the width of the channel sensed by the satellite. The reflectance is indicated as a percentage or a ratio of the upwelling radiation sensed by the satellite divided by the assumed downwelling radiation from the sun that was reflected to yield the upwelling radiation. The irradiance value is indicated as milliwatts/$m^2$/nm, where the nanometer value is the width of the channel sensed by the satellite.

For ease of viewing by human observers, a satellite scene at an arbitrary wavelength can be depicted as a gray-scale satellite image in which lighter gray pixels denote a greater light intensity emanating from the defined area of each pixel, and darker gray pixels denote a lesser light intensity emanating from the area of each pixel. The lighter and darker pixels do not denote lighter and darker colors, such as yellow and blue, respectively, because all pixels denote the intensity of radiation of the same wavelength (or narrow band around the wavelength).

Database 11 also includes satellite scenes of the same surface area of water acquired at the same wavelength but at different times. For example, a second satellite scene 21 may be acquired several days after a first scene 20 of the same area was acquired. A third satellite scene 22 is acquired several days after the second scene 21 is acquired. Some of the parameters that affect the sensed light intensity change over time, but the water depth, which is corrected for tidal variations, and the bottom cover remain constant over several days. Thus, database 11 includes first light intensity values 20 acquired over a plurality of wavelengths as well as second light intensity values 21 acquired over the same plurality of wavelengths. In one embodiment, a limited number of scenes are acquired at separate wavelengths within the range from 400-950 nanometers. In another embodiment, quasi-continuous hyperspectral scenes are acquired in up to hundreds of different spectral channels over a wide wavelength range. Some of the scenes are in the visible light spectrum, while others are in the near infrared spectrum. For simplicity, the calculation of water depths is explained below using scenes acquired at only eight separate wavelengths. In this example, the first eight light intensity values 20 are acquired at a first time, whereas the second eight light intensity values 21 are acquired at a second time. The first and second light intensity values are all associated with the same defined surface area of the body of water.

Modular software application 13 executing on data analysis server 12 calculates modeled light intensity values at each of the eight wavelengths. Each of the modeled light intensity values is associated with the defined surface area and depends on an assumed bottom cover on the bottom of the body of water below the first surface area as well as on the assumed water constituents in the water. Each of the modeled light intensity values also depends on an assumed depth between the defined surface area and the bottom.

For each of the eight wavelengths, modular software application 13 calculates sixteen differences between each modeled light intensity value on the one hand and the eight first 20 and eight second 21 light intensity values on the other hand. Application 13 performs an iterative fitting algorithm that iteratively varies the assumed depth, the assumed bottom cover and the assumed water constituents to arrive at a minimum deviation in the sixteen differences. In one embodiment, application 13 weights each of the sixteen differences and then determines the smallest sum of the weighted differences. In another embodiment, application 13 determines the minimum root-mean-square (RMS) error of the sixteen pairwise differences by calculating the RMS error using different bottom covers and water constituents at incrementally larger assumed depths, such as at ten centimeters intervals. The estimated depth is the depth at which the total deviation in the plurality of the differences is minimized. System 10 then displays the estimated depth below the defined surface area on graphical user interface 14.

Figure 2:
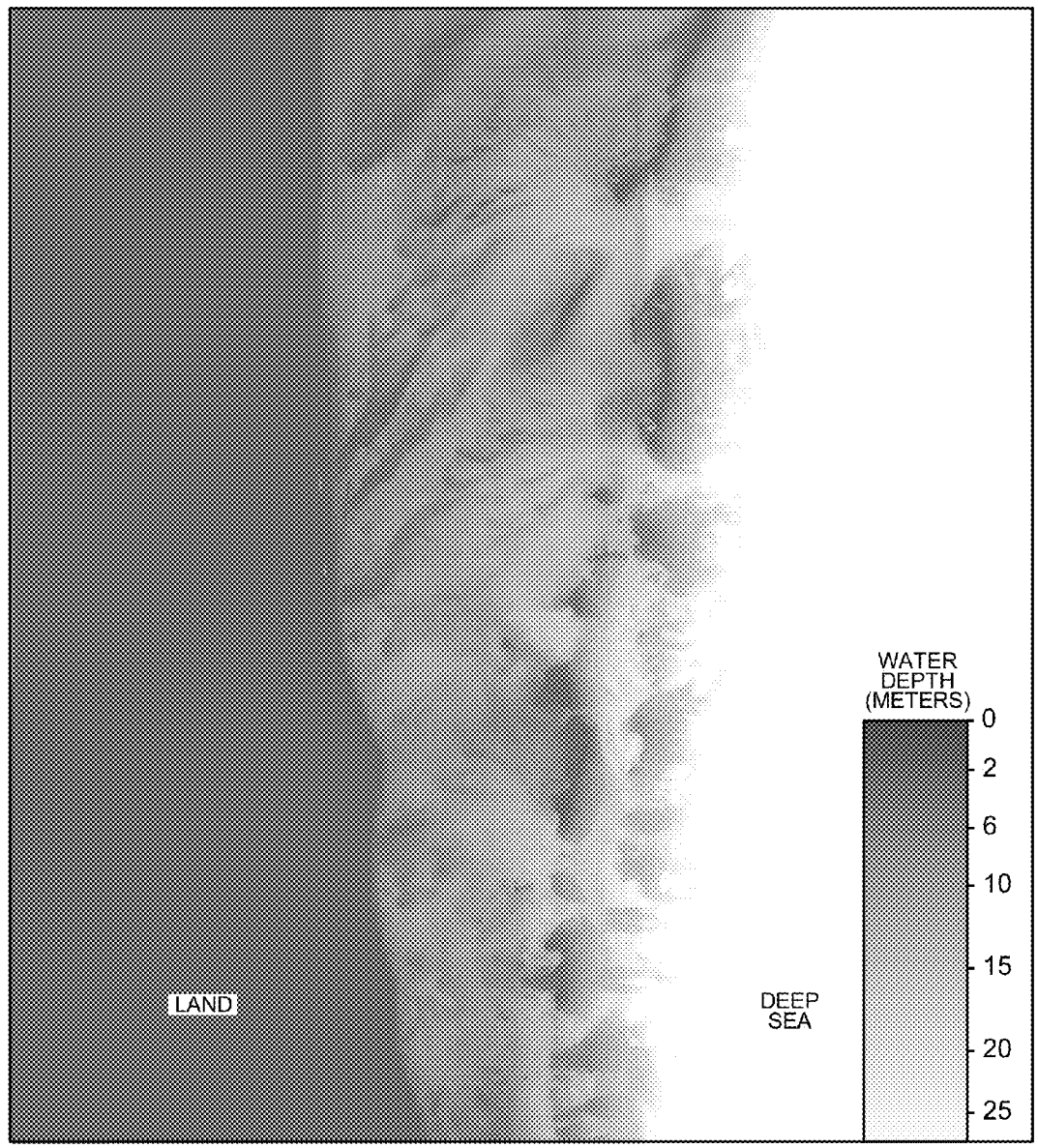
FIG. 2 is a graphical representation of a body of water in which differing depth ranges are assigned different gray tones.

FIG. 2 shows a one representation of water depth displayed on graphical user interface 14. FIG. 2 is a graphical representation of the body of water in which differing depth ranges below defined areas (corresponding to pixels) are assigned different colors or gray tones. The estimated depth below the defined surface area is displayed as a pixel having the color or gray tone of the range in which the estimated depth falls, as indicated by the key to the right of the bathymetric chart. Alternatively, estimated depth can be displayed as a traditional navigational chart with isolines of constant depth. The estimated depth can also be displayed as a table in which the coordinates (longitude and latitude) are listed on the axes, and the estimated depth is entered as a number for each defined area.

Figure 3:
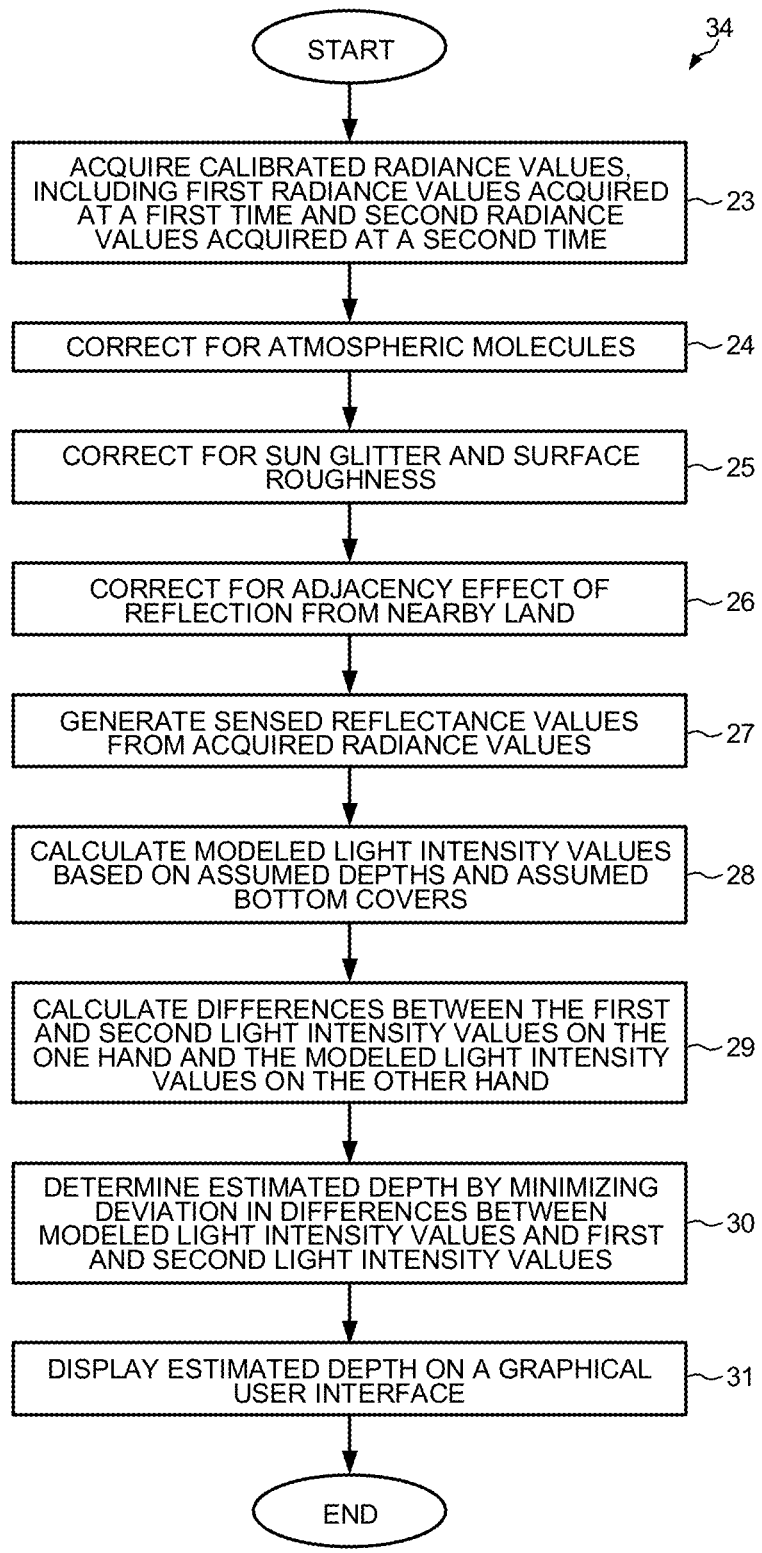
FIG. 3 is a flowchart of steps for using satellite data to determine water depth despite varying water turbidities.

FIG. 3 is a flowchart of steps 23-31 of a method 34 by which system 10 uses satellite data to generate a representation showing water depths.

Figure 4:
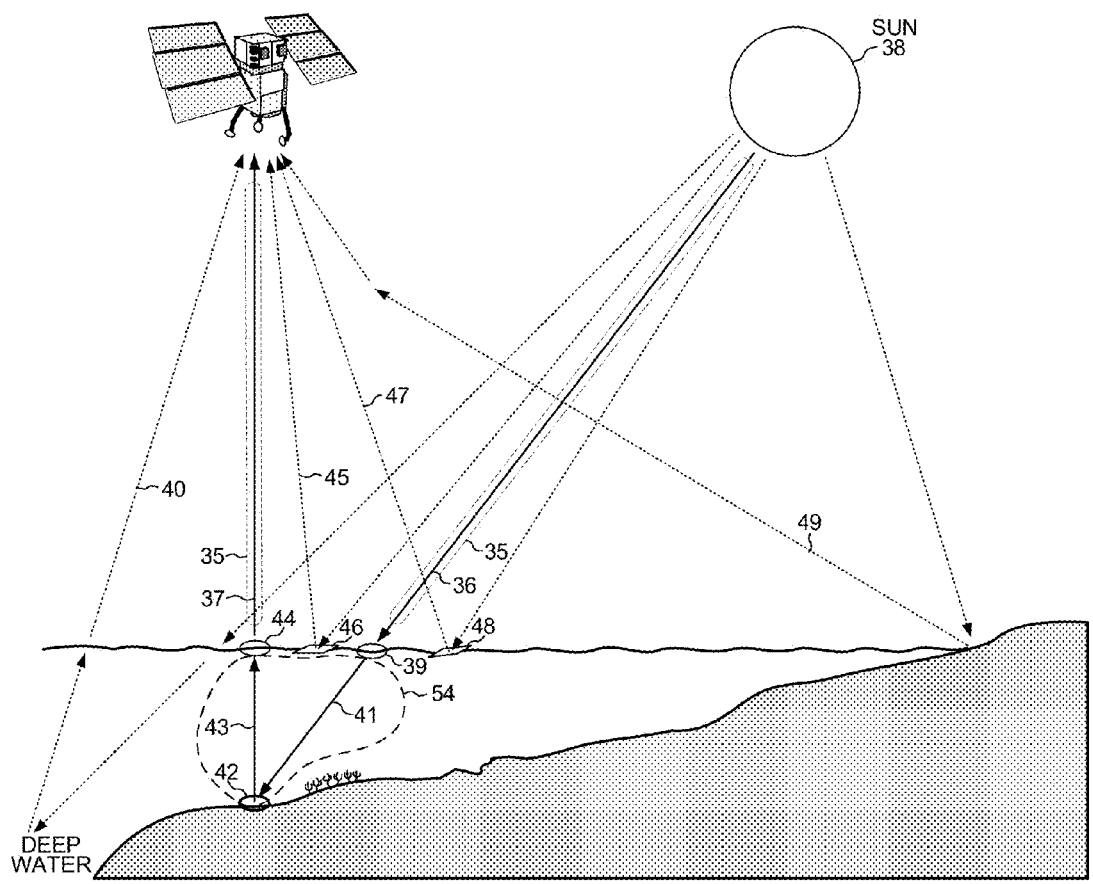
FIG. 4 is a diagram showing how radiation from the sun is scattered, absorbed and reflected as the radiation reflects off the bottom of a body of water and is sensed by a satellite.

Method 34 accurately estimates water depth despite unknown and varying turbidity of the water below different defined surface areas beneath which the water depth is estimated. Method 34 is explained with reference to how the radiation shown in FIG. 4 is absorbed and scattered. The various modules of modular software application 13 perform the different steps of method 34 that are used to arrive at the modeled light intensity value for each discrete wavelength. Control files operate the various program modules.

In a first step 23, calibrated radiance values are supplied by a satellite data provider. The radiance values are acquired and stored in database 11. The radiance intensity values are calibrated for the width of the sensor channel over which the radiation is sensed. For example, satellite data can be obtained from satellite data providers using systems such as MERIS (by the European Space Administration ESA), MODIS (by NASA), WorldView-2 (by DigitalGlobe, NYSE: DGI), and Sentinel 2 and 3 (by ESA). Radiance values are stored in database 11 that were acquired at different times. For example, eight first light intensity values 20 are acquired at a first time, and eight second light intensity values 21 are acquired at a second time.

In step 24, system 10 corrects for atmospheric aerosols and other molecules 35 that scatter or absorb the downwelling radiation 36 as well as the upwelling radiation 37 from the sun 38, as depicted in FIG. 4. The first module of application 13 performs the image-based aerosol retrieval and atmospheric correction on the sensor radiance data. In one embodiment, the aerosol concentration is determined on a pixel-by-pixel basis by comparing the radiation 40 sensed from over water to a modeled radiation. The aerosol concentrations in the columns of air through which the radiation travels are determined using a coupled inversion procedure of atmospheric properties and constituents in deep and shallow water.

In step 25, system 10 corrects for the sun glitter or glint off the surface of the water. A second module of application 13 performs the pixel-by-pixel sun glitter correction. The glitter correction subtracts the components of the radiation that do not emanate from the defined surface area. The radiation that is used to determine water depth is the downwelling radiation 36 that passes through the entering surface 39, passes downward 41 through the water to the bottom 42, is reflected off the bottom 42 and passes upward 43 through the defined surface area 44 and becomes the upwelling radiation 37 that is detected by the satellite sensor. However, the radiation acquired by the satellite sensor as being associated with the defined surface area on the body of water may in fact emanate from other surface areas due to reflection off the flat water surface of another area or due to reflection off a rough water surface of yet another area. FIG. 4 shows first glitter radiation 45 that reflects off a flat, horizontal water surface 46 between the entering surface 39 and the defined surface area 44. FIG. 4 also shows a second glitter radiation 47 that reflects off a slanted water surface 48 caused by rough water. The second module of application 13 subtracts all of the components of the radiation that do not emanate from the defined surface area that is being sensed.

In step 26, system 10 corrects for the adjacency effect caused by reflection off of a nearby shoreline. Land tends to reflect radiation more than does water, so a halo forms along the shoreline. Some of the radiation that is reflected from the land scatters off particles in the air and is redirected toward the satellite sensor. The radiation 49 that is reflected from the land can be even greater than the radiation 47 reflected from rough water nearer to the defined surface area 44. A third module of application 13 performs the correction for the adjacency effect. The third module calculates the radiance that is to be subtracted from each pixel over the water by using the land-covered portion of the satellite scene or other contributing satellite scenes. In one embodiment, the land surface around the target water point is divided by sectors of fixed angular width. For each sector, the average upward radiance according to instrument readings is estimated. Initial atmospheric parameters are assumed. The contribution from the adjacency effect from the entire horizontally homogeneous volume above each sector is derived using a radiative transfer equation. Then the integral of this result is calculated for a point source above each sector. Then the relative contributions of the sectors are determined based on the azimuths from each point source above each sector to the point at the center of the defined surface area 44. The contribution to radiance of each sector is multiplied by its relative contribution to the adjacency component at the center of area 44. The sum of the weighted contributions from all sectors is then subtracted from the pixel representing the defined surface area 44.

Figure 5A:
FIG. 5A is a satellite image of a coastal region in which sun glitter, atmospheric scattering and the land adjacency effect have obscured the image.
Figure 5B:
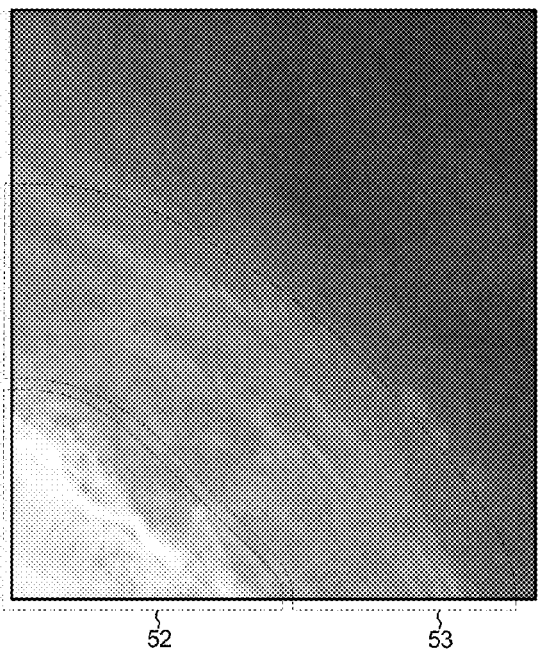
FIG. 5B shows a subsurface reflectance image of the coastal region of FIG. 5A in which the light intensity values have been corrected for sun glitter, land adjacency and atmospheric molecules.

FIG. 5A shows an input radiance image with light intensity values as supplied by a satellite data provider. The effects on the sensed light intensity from adjacency to land 50 and from sun glitter 51 are apparent. FIG. 5B shows a subsurface reflectance image in which the light intensity values have been corrected for sun glitter, land adjacency and atmospheric molecules. The area 52 of the water surface from which the largest adjacency effect has been corrected is outlined, as well as the area 53 in which the sun glitter in FIG. 5A was most pronounced. The effect of absorption of the downwelling radiation 36 and the upwelling radiation 37 by aerosols and other atmospheric molecules has also been removed.

In step 27, a fourth module of application 13 converts the sensed radiance values that are corrected for atmospheric molecules, sun glitter and the adjacency effect into to sensed subsurface reflectance values. A lookup table is first generated using an azimuthally resolved radiative transfer model that converts reflectance values to the associated radiance values. The angle of the sun and the refraction at the air-water and water-air interfaces in the radiation path from the sun to the satellite sensor are considered. The lookup table is stored in database 11. In addition, a bi-directionality correction is performed using an angularly-dependent Q-factor that converts reflectance from radiance into reflectance from irradiance. The Q-factor equals the upwelling irradiance divided by the upwelling radiance taking into account the solar zenith angle, the satellite zenith angle and the azimuth angles of the satellite and the sun. The Q-factor represents the angular distribution of the light field under water and is used to correct for the impact of the non-isotropic underwater light field. Then the sensed subsurface reflectance is determined from the corrected input radiance value using the lookup table. The sensed subsurface reflectance is expressed as irradiance reflectance ($R_{IRR}$).

After performing steps 24-27 to generate the sensed subsurface reflectance values, the bathymetry application module of system 10 generates modeled subsurface reflectance intensity values based on various assumptions. The subsurface reflectance is the intensity of radiation reflected off of the bottom 42 that reaches just below the surface 44 divided by the intensity of radiation that entered the water at entering surface 39. The subsurface reflectance intensity is affected by the absorption due to pure water, the constituents in the water, and the type of bottom from which the radiation is reflected. These effects take place in the below-surface region 54.

In step 28, modeled light intensity values are calculated for the subsurface reflectance. The bathymetry module of application 13 calculates many modeled light intensity values at each of the eight wavelengths based on (i) an assumed depth between defined surface area 44 and bottom 42, (ii) an assumed bottom cover, and (iii) assumed water constituents.

Figures 6, 7, 8:
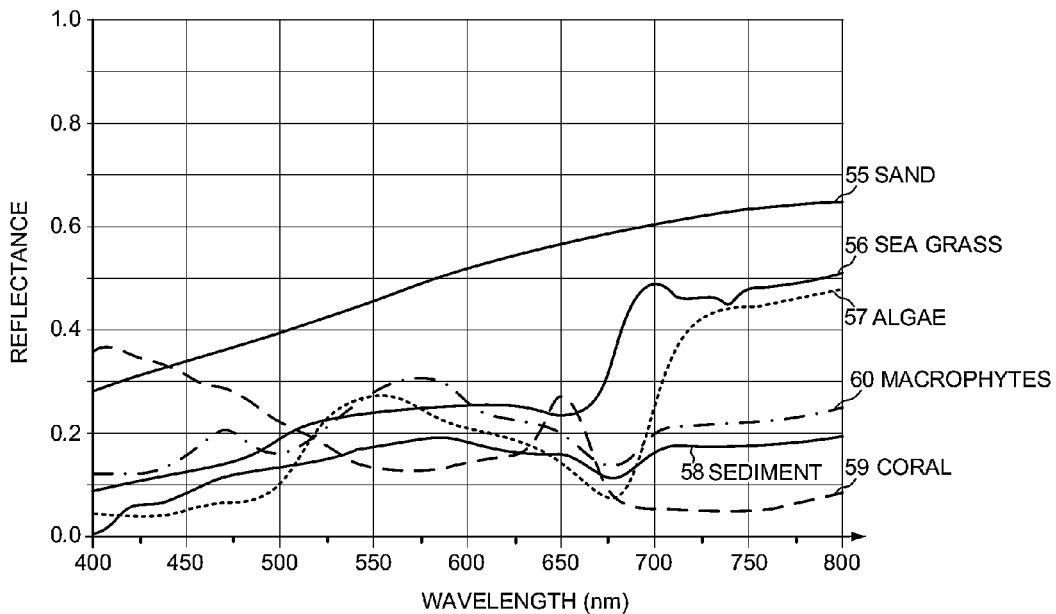
FIG. 6 is a graph of the observed reflectance of different bottom cover types at various wavelengths.
FIG. 7 is an equation used to calculate modeled light intensity values expressed as subsurface reflectance based on water depth, water constituents and bottom cover.
FIG. 8 is a simplification of the equation shown in FIG. 7.

Step 28 involves a thematic processing that classifies the bottom reflectance according to the spectral signature of different bottom covers using fuzzy logic and then assigns individual probability functions to each bottom cover. Each type of bottom exhibits a different spectral signature of reflectance. The spectral signatures of many bottom types are stored in database 11. Some of the possible bottom covers include sand, sea grass, turf algae, bottom sediments, coral reef and limestone rock. FIG. 6 is a graph of the observed reflectance of different bottom types at various wavelengths. FIG. 6 shows the spectral signatures of sand 55, sea grass 56, algae 57, sediment 58 and coral 59. For example, the reflectance of sand steadily rises over the range of wavelengths from 400 nm to 800 nm. On the other hand, algae has a higher reflectance in the greenish part of the spectrum between 525-575 and a lower reflectance in the bluish part of the spectrum below 500 nm and in the reddish part of the spectrum around 685 nm where chlorophyll absorbs light. In one embodiment, the modeling of step 28 calculates the modeled light intensity values at the eight wavelengths 400, 450, 500, 550, 600, 650, 700 and 750 nanometers. In another embodiment, wavelengths around the fluorescence peak of chlorophyll from about 660 to 715 nanometers are excluded in order in order to avoid the contribution of the fluorescence to the reflectance.

A water column correction is performed on the modeled light intensity values. Thus, the modeled light intensity values are based on assumed water constituents, such as suspended inorganic matter, phytoplankton, macrophytes, and colored dissolved organic matter (also called CDOM or gelbstoff). Each water constituent also has a spectral signature. For example, the reflectance of macrophytes 60 over the range of wavelengths from 400 nm to 680 nm, as shown in FIG. 6, is similar to that of algae because both contain chlorophyll. At wavelength larger than 680 nm, however, the spectral signatures differ significantly because the reflectance of chlorophyll in the algae that is dissolved in water decreases from red to infrared, whereas the reflectance of macrophytes and solid vegetation increases significantly. The spectral signatures of the various possible water constituents are stored in database 11. The reflectance of pure water must also be considered in the modeled light intensity values, although the reflectance of pure water over the range of wavelengths from 400 nm to 800 nm is much lower than that of the probable water constituents in oceans and lakes.

Finally, the modeled light intensity values take into account the assumed depth of the water. The intensity of the radiation that penetrates the water decreases exponentially with increasing depth due to both absorption and scattering. The absorption is wavelength dependent, and the scattering increases with turbidity. In the visible spectrum, the red portion of the radiation attenuates faster than the shorter wavelengths of the blue portion.

In step 28, for the example of method 34 that uses eight wavelengths, many modeled light intensity values are generated at each wavelength based on (i) many assumed depths, (ii) many assumed bottom covers, and (iii) many assumed water constituents.

In step 29, for each wavelength, a plurality of differences are calculated between the many modeled light intensity values on the one hand and the eight first and eight second light intensity values on the other hand. The changing water constituents over time hinder the calibration of the depth determination using the radiance values acquired from satellite sensors. Although the relative depths under different locations can be determined, varying water constituents cause an error in the determination of the actual depth under any specific location. Thus, an accurate determination of water depth cannot be obtained just by using radiance values acquired at a single time when the water happens to include a high degree of turbidity. High turbidity means that the water contains a large number of particles per volume. Conventionally, a limited number of depth measurements obtained from a ship equipped with SONAR or LIDAR are used to calibrate the relative depths determined using light intensity values acquired from satellite sensors. By using multiple sets of radiance values acquired at different times when the turbidity of the water has changed, however, a more accurate estimate of water depth can be obtained without using SONAR because the depth and bottom reflectance are likely to remain constant, and the effects of the different turbidities cancel each other out. Thus, method 34 estimates the water depth using both the first differences associated with the light intensity values acquired at the first time as well as the second differences associated with the light intensity values acquired at the second time and does not require calibration using another measurement mechanism.

In step 30, the deviation in the plurality of differences is minimized by varying the assumed depth, the assumed bottom cover and the assumed water constituents. Application 13 iteratively varies the assumed depth, the assumed bottom cover and the assumed water constituents to determine the minimum sum of the sixteen pairwise differences or the minimum root-mean-square (RMS) error of the sixteen pairwise differences between the sixteen modeled light intensity values on the one hand and the eight first and eight second light intensity values on the other hand. For each defined surface area 44, the estimated depth is the depth at which the total deviation in the sixteen differences is minimized.

In step 31, system 10 displays the estimated depth between defined surface area 44 and bottom 42 on graphical user interface 14.

FIG. 7 shows an equation 62 used in one embodiment of step 28 to calculate the modeled light intensity values expressed as subsurface irradiance reflectance ($R_{IRR}$). The modeled reflectance is calculated using many possible values of the variables, such as the assumed depth "z", the reflectance "$R_B$" resulting from the assumed bottom cover, and the absorption "a" and backscattering "b" resulting from the assumed water constituents. For example, the absorption "a" is the sum of the products of the specific absorption of each of the water constituent times the concentration of that water constituent. In addition, equation 62 includes other ancillary coefficients that are constant over all water systems and are determined by fitting the results of equation 62 to the average results over many (e.g., thousands) data points. The ancillary coefficients are $A_1$, $A_2$, $K_0$, $K_{1W}$, $K_{1B}$, $K_{2W}$ and $K_{2B}$ and have the approximate values 1.0546, 0.9755, 1.0546, 1.9991, 1.2441, 0.2995 and 0.5182, respectively. The subsurface irradiance reflectance of equation 62 is composed of a deep water component and a shallow water component. The coefficient $R_\infty$ precedes the deep water component and represents the reflectance at infinite depth. As the depth "z" increases, the negative exponent of $A_1$ becomes large, and the contribution of the deep water component becomes $R_\infty$. As an approximation, $R_\infty$ equals f[b/(a+b)] where f=0.33.

As the depth "z" decreases, the exponent of the bottom reflectance $R_B$ goes towards zero, and the contribution of the shallow water component becomes $A_2$. The extinction coefficients $K_0$, $K_{1W}$, $K_{1B}$, $K_{2W}$ and $K_{2B}$ represent various attenuation effects on the radiation. $K_{1W}$ and $K_{2W}$ are associated with the water column, while $K_{1B}$ and $K_{2B}$ are associated with the bottom cover. The term cos θ is the subsurface solar zenith angle at the defined surface area 44.

FIG. 8 shows a simplified equation 63 used in another embodiment of step 28 to calculate the modeled subsurface irradiance reflectance ($R_{IRR}$). For equation 63, the approximation for $R_\infty$ is also used where $R_\infty$=f[b/(a+b)] and f=0.33. In equation 63, K equals the square root of a(a+2b), and z is the depth of the water. The absorption "a" is the sum of the absorption of water and of each of the water constituents adjusted for concentration. Thus, $a=a_W+c_1 a_1+c_2 a_2+c_N a_N$, where $a_W$ is the specific absorption of water, and $c_1$ through $c_N$ are factors related to the concentrations of the water constituents $c_1$ through $c_N$. Similarly, the backscattering "b" is the sum of the scattering to the back-oriented hemisphere caused by each of the water constituents adjusted for concentration. Thus, $b=b_W+c_1 b_1+c_2 b_2+c_N b_N$, where $b_W$ is the backscattering caused by pure water, and $c_1$ through $c_N$ are factors related to the concentrations of the water constituents $c_1$ through $c_N$. In an alternative embodiment, scattering coefficients "s" can be used instead of the hemispherical backscattering coefficients "b". In that event, K would equal the square root of a(a+2s). The scattering coefficients "s" represent the isotropic scattering in all directions instead of only backwards towards the back-oriented hemisphere. In equation 63, the bottom reflectance "$R_B$" is a weighted combination of the reflectances of the assumed bottom covers.

FIG. 9 is a table showing examples of the calculations performed in step 28 using equation 63. FIG. 9 shows sample calculations of modeled light intensity values that are compared to the sensed light intensity values to generate the plurality of differences in step 29. The sample calculations shown in FIG. 9 are for a single combination of assumed depth "z", bottom reflectance "$R_B$" due to assumed bottom covers, and assumed water constituents that result in an absorption "a" and a backscattering "b". FIG. 9 shows how the difference between the sensed subsurface irradiance reflectance and the modeled subsurface irradiance reflectance is determined for the reflectance at each of eight wavelengths acquired at a first time. The modeled subsurface irradiance reflectance calculated according to equation 63 is listed in the row labeled Modeled R_irr=R_inf*(1−e(−2*K*z))+R_bot*e(−2*K*z).

FIG. 10 shows sample calculations similar to those of FIG. 9 except that differences are calculated between the sensed subsurface irradiance reflectance and the modeled subsurface irradiance reflectance for the reflectance at each of the same eight wavelengths acquired at a second time.

The steps of method 34 are now illustrated using the first values for the first wavelength of 442.27 nm listed in FIG. 9 and the second values for the same wavelength listed in FIG. 10. In step 23, system 10 stores a first light intensity value 83.0900 that is indicative of a radiance at the first wavelength 442.27 nm emanating at the first time from the surface area 44 of a body of water over which the satellite scene was acquired. In addition to the first calibrated radiance value 83.0900 that is acquired at the first time, system 10 also stores a second calibrated radiance value 74.3300 that is acquired at a second time. For example, the second time is one week after the first time. These radiance values are expressed in mW/sr/nm/sqm and have been calibrated for the width of the sensor channel that is centered at 442.27 nm.

In step 24, the stored radiance values are corrected for atmospheric molecules, such as aerosols. In the sample calculations of FIGS. 9-10, the values in the row labeled "Radiance at sensor" have already been corrected for atmospheric molecules. For the values in FIGS. 9-10, the aerosol optical depth at 500 nm was 0.2450. In step 26, the acquired light intensity values are corrected for the adjacency effect of reflection from nearby land. Note that the steps of method 34 need not necessarily be performed in the order listed in FIG. 3. The radiance value at the first time corrected for the adjacency effect is 81.2200, and the radiance value at the second time corrected for the adjacency effect is 73.2800. In step 25, the light intensity values are corrected for sun glitter and surface roughness of the water. The radiance value at the first time corrected for sun glitter is 81.1700, and the radiance value at the second time corrected for sun glitter is 68.2000.

In step 27, system 10 converts the sensed radiance values that are corrected for atmospheric molecules, the adjacency effect and sun glitter into to sensed subsurface irradiance reflectance values. The conversion is performed using a lookup table stored in database 11 that is generated using an azimuthally resolved radiative transfer model. The sensed subsurface irradiance reflection at the first time is 0.087014 and at the second time is 0.087416.

In step 28, modeled light intensity values are calculated that are indicative of the radiance at the first wavelength 442.27 nm emanating from surface area 44 of the body of water. The modeled light intensity values depend on the assumed bottom cover on the sea floor below surface area 44, on the assumed water constituents, and on the assumed depth between surface area 44 and the bottom. The modeled subsurface irradiance reflection ($R_{IRR}$) is 0.073600 at the first time and 0.074173 at the second time. For the sake of clarity, the modeled $R_{IRR}$ is calculated using the simplified equation 63 of FIG. 8. Other embodiments of step 28, however, use more rigorous modeling equations, such as equation 62 of FIG. 7. In the sample calculations of FIGS. 9-10, the water depth is assumed to be 2.50 meters. In another iteration of step 28, entirely new modeled light intensity values are calculated using a different assumed depth.

The coefficient "K" in equation 63 is listed in FIGS. 9-20 in the row labeled "Extinction K=sqrt(a*(a+2*b))". The below-surface absorption "a" used to calculate the modeled $R_{IRR}$ is based on the assumed water constituents and on the absorption of pure water at the wavelength of the particular spectral band. For the satellite scenes acquired at the first time, it is assumed that there are water constituents including phytoplankton with a concentration of 1.50, gelbstoff with a concentration of 0.03 and inorganic suspended matter with a concentration of 1.00. The concentrations are listed in various units of weight per volume. For the satellite scenes acquired at the second time, it is assumed that phytoplankton has a concentration of 1.80, gelbstoff has a concentration of 0.03 and the inorganic suspended matter has a concentration of 1.20. The values listed in the rows labeled "Specific absorption total suspended matter," "Specific absorption gelbstoff," and "Specific absorption phytoplankton" for each wavelength are related to the specific absorption of the constituents at each wavelength. The value listed in the row "Total Absorption (a)" is the absorption of pure water plus the sum of the products of the specific absorption times the concentration for each of the water constituents. The specific absorption values for different water constituents at different wavelengths are stored in database 11. For simplicity of the sample calculations, the specific absorption of the inorganic suspended matter is assumed to be zero. The total absorption "a" is 0.072830 at the first time and 0.079454 at the second time because of the different concentrations of the water constituents.

The below-surface absorption "b" used to calculate the modeled $R_{IRR}$ is also based on the assumed water constituents and on the backscattering of pure water at the wavelength of the particular spectral band. For calculating the backscattering at the first time, the same concentrations of water constituents as used for calculating the absorption at the first time are assumed. Similarly, the same concentrations of the water constituents at the second time that were used to calculate the absorption are used to calculate the backscattering. The total backscattering "b" is the sum of the products of the concentration times the backscattering for each of the water constituents. For simplicity of the sample calculations, the backscattering of the gelbstoff and the phytoplankton is assumed to be zero. The total backscattering "b" is 0.014742 at the first time and 0.0173496 at the second time.

The modeled bottom reflectance ($R_B$ or R_bot) is calculated based on the assumed composition of the bottom cover. In the sample calculations, it is assumed that at both the first time and second time the bottom is 80% covered by bottom cover type #1 and 20% by bottom cover type #2. The assumed reflectances of the different bottom cover types are time independent, so the values in the rows labeled "Bottom cover type 1" and "Bottom cover type 2" for each wavelength are the same at the first time in FIG. 9 and at the second time in FIG. 10. The reflection (or albedo) values for different bottom covers are stored in database 11.

In step 29, a plurality of first differences are determined between the sensed first light intensity value 0.087014 and each of the plurality of modeled light intensity values based on different assumed water constituents, bottom reflectance and water depth. One of the plurality of modeled light intensity values is 0.073600, which is based on an assumed water depth of 2.5 meters, 80% bottom cover type 1, 20% bottom cover type 2, a 1.50 concentration of phytoplankton, a 0.03 concentration of gelbstoff and a 1.00 concentration of total suspended matter. One of the plurality of first differences is 0.191640, which represents the difference between the modeled subsurface irradiance reflection ($R_{IRR}$) of 0.073600 and the sensed subsurface irradiance reflection ($R_{IRR}$) 0.087014 at the first time.

Step 29 also involves the calculation of a plurality of second differences between the sensed second light intensity value 0.087416 and each of the plurality of modeled light intensity values. At the second time, the bottom cover is assumed not to have changed, whereas different concentrations of water constituents are assumed. In other calculations not shown in FIGS. 9-10, different water depths are also assumed. One of the plurality of second differences is 0.189176, which represents the difference between the modeled subsurface irradiance reflection ($R_{IRR}$) of 0.074173 and the sensed subsurface irradiance reflection ($R_{IRR}$) 0.087416 at the second time.

In the embodiment of FIGS. 9-10, each difference between the modeled reflectance and the sensed reflectance is weighted before the differences are summed. The sensed light intensity values at some wavelengths are more likely to include inaccuracies that at other wavelengths. For example, radiation at longer wavelengths is completely absorbed through a long water column and thus cannot provide an indication of bottom reflectance, which is used to determine water depth. For this reason, the differences obtained from the longer wavelengths 680.56 and 708.06 nanometers are given a 0.5 weighting, and the difference obtained from the longest wavelength 864.61 is given a zero weighting. The differences obtained from the longer wavelengths 680.56 and 708.06 nanometers are not simply given a zero weighting because the longer wavelengths are differently absorbed by the water constituents and help to match the smallest sum of the differences to the spectral signature of the actual water constituents, such as those shown in FIG. 6.

At deep water depths, all of the radiation is completely absorbed even at shorter wavelengths, and there is no bottom reflection that can be used to determine depth. Method 34 can be used to accurately estimate water depth up to about twenty-five meters. This is sufficient for many applications. For example, in nautical navigation it is sufficient to know which water locations have depths under twenty-five meters because fifteen meters is adequate to accommodate even the largest ships.

In step 30, the estimated water depth beneath the surface area 44 is determined by minimizing the deviation among the plurality of first differences obtained from the satellite scene at the first time and the plurality of second differences obtained from the satellite scene at the second time. FIG. 9 shows the sum 0.090952 of weighted first differences between the modeled and sensed light intensity values at the first time, and FIG. 10 shows the sum 0.085698 of weighted second differences between the modeled and sensed light intensity values at the second time. Each of these sums is obtained using a single combination of assumed depth "z", bottom reflectance "$R_B$" due to assumed bottom covers, and assumed water constituents that result in an absorption "a" and a backscattering "b". In a fitting process, different differences are calculated by varying the assumed depth, the assumed bottom cover with its associated bottom reflectance, and the assumed water constituents with their associated absorption and backscattering. The assumed water depth "z" is chosen as the estimated water depth that results in the smallest deviation among the first and second differences, in this case the smallest combined sum of the weighted first differences and sum of the weighted second differences. In the calculations of FIGS. 9-10, an assumed depth would be a more accurate estimate of the actual depth than the assumed 2.50 meters if the parameters "a" and "b" of the assumed water constituents, depth "z", and bottom reflectance "$R_B$" result in a combined sum of differences that is less than 0.090952 plus 0.085698.

The process of minimizing the deviation in the first and second differences can be viewed as fitting the curves of the modeled reflectances to the curves of the sensed reflectances. The parameters "a", "b", "z" and "$R_B$" are varied such that each successive curve of the modeled reflectances more closely resembles the curve of the sensed reflectances. When the curves of the modeled reflectances at the first time and at the second time are nearly superimposed over the curves of the sensed reflectances at those times, the "z" parameter included in the combination of parameters that generated the modeled reflectances is the best estimate of the actual water depth.

Figure 11:
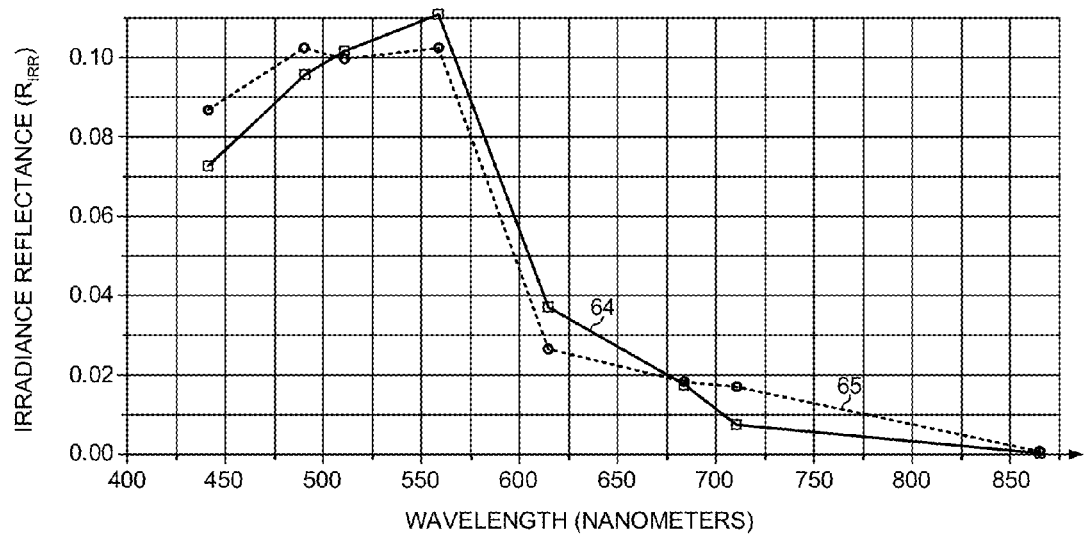
FIG. 11 is a graph comparing the modeled subsurface reflectances calculated in FIG. 9 to subsurface reflectances sensed at a first time.
Figure 12:
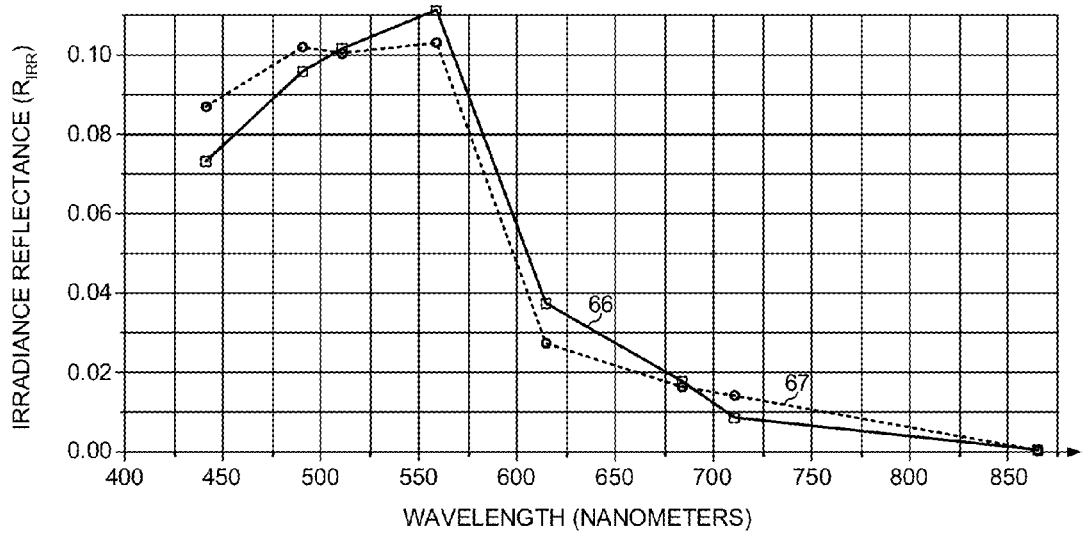
FIG. 12 is a graph comparing the modeled subsurface reflectances calculated in FIG. 10 to subsurface reflectances sensed at a second first time.

FIG. 11 shows a curve 64 of the modeled subsurface irradiance reflectances calculated in FIG. 9 in comparison to a dashed curve 65 of the subsurface irradiance reflectances sensed at the first time. FIG. 12 shows a curve 66 of the modeled subsurface irradiance reflectances calculated in FIG. 10 in comparison to a dashed curve 67 of the subsurface irradiance reflectances sensed at the second time. A new "z" parameter of the parameter combinations used to generate modeled reflectance curves that together more closely match the sensed reflectance curves 65 and 67 would be a better estimate of the actual water depth than the 2.50 meters used to generate the modeled reflectance curves 64 and 66. The process of better fitting the new modeled reflectance curves to the sensed reflectance curves minimizes the deviation in the plurality of first differences and in the plurality of second differences.

In another embodiment, the deviation in the differences is minimized by determining the root-mean-square (RMS) difference of the eight pairwise first differences plotted in FIG. 11 and the eight pairwise second differences plotted in FIG. 12. By calculating the RMS error between the curves, points that are farther apart are given a bigger negative weighting. Thus, parallel curves would have a smaller RMS deviation than curves that criss-cross each other but yet have the same aggregate difference between the points as do the parallel curves.

System 10 displays on graphical user interface 14 the difference between each first light intensity value acquired at the first time and the associated modeled light intensity value for the same wavelength in a plot such as that shown in FIG. 11. System 10 also displays the difference between each second light intensity value acquired at the second time and the associated modeled light intensity value for the same wavelength in another plot such as that shown in FIG. 12.

Finally in step 31, system 10 displays the estimated depth between the surface area 44 and the bottom 42 on graphical user interface 14 as a pixel of a digital image in which the color or gray scale of the pixel corresponds to water depth under the surface area 44.

Where an embodiment of the bathymetric system 10 is implemented in software, the functions of the software may be stored on or transmitted over as one or more instructions or code on a computer-readable medium. The computer-readable medium may be a computer storage medium or a communication medium including any medium that facilitates the transfer of a computer program from one place to another. The storage medium may be any available medium that can be accessed by a computer. The hard disk 16 of data analysis server 12 on which the bathymetry application module executes is an example of such a computer-readable medium. By way of example, and not limitation, such computer-readable medium can be RAM, ROM, EEPROM, CD-ROM or other optical disk storage, magnetic disk storage or other magnetic storage devices, or any other medium that can be used to carry or store desired program code in the form of instructions or data structures and that can be accessed by a computer.

Although the present invention has been described in connection with certain specific embodiments for instructional purposes, the present invention is not limited thereto. Although an embodiment is described above in which modeled reflectance values are compared to reflectance values derived from radiances sensed at a first time and at a second time, differences can also be calculated between modeled reflectance values and sensed reflectance values acquired at more than two points in time. Accordingly, various modifications, adaptations, and combinations of various features of the described embodiments can be practiced without departing from the scope of the invention as set forth in the claims.

What is claimed is:

1. A method comprising:
storing a first light intensity value indicative of a radiance at a first wavelength emanating from a surface area of a body of water at a first time;
storing a second light intensity value indicative of the radiance at the first wavelength emanating from the surface area of the body of water at a second time;
calculating a plurality of modeled light intensity values at the first wavelength, wherein each of the plurality of modeled light intensity values is indicative of the radiance at the first wavelength emanating from the surface area of the body of water, and wherein each of the plurality of modeled light intensity values depends on an assumed bottom cover on a bottom below the surface area and on an assumed depth between the surface area and the bottom;
determining a plurality of first differences between the first light intensity value and each of the plurality of modeled light intensity values;
determining a plurality of second differences between the second light intensity value and each of the plurality of modeled light intensity values;
minimizing a deviation among the plurality of first differences and the plurality of second differences by varying the assumed depth and the assumed bottom cover; and
displaying an estimated depth between the surface area and the bottom, wherein the estimated depth is the assumed depth that results in the minimized deviation among the plurality of first differences and the plurality of second differences, and wherein the estimated depth is displayed on a graphical user interface.

2. The method of claim 1, wherein the plurality of modeled light intensity values includes a first modeled light intensity value based on the assumed bottom cover being sand and a second modeled light intensity value based on the assumed bottom cover being seagrass.

3. The method of claim 1, wherein a contribution to the radiance caused by an adjacency of the surface area of the body of water to land has been removed from the first light intensity value.

4. The method of claim 1, wherein each of the plurality of modeled light intensity values also depends on a concentration of an assumed water constituent, and wherein the minimizing the deviation among the plurality of first differences and the plurality of second differences involves varying the concentration of the assumed water constituent.

5. The method of claim 4, wherein the assumed water constituent is taken from the group consisting of: suspended inorganic matter, phytoplankton, macrophytes, and dissolved organic matter.

6. The method of claim 1, wherein the surface area corresponds to a pixel of a satellite image of the body of water, and wherein the estimated depth is indicated on the graphical user interface as a predetermined color of the pixel that corresponds to a range of the estimated depth.

7. A method comprising:
storing first light intensity values at a plurality of wavelengths each associated with a first surface area of a body of water, wherein each of the first light intensity values is acquired at a first time;
storing second light intensity values at the plurality of wavelengths each associated with the first surface area of the body of water, wherein each of the second light intensity values is acquired at a second time;
calculating modeled light intensity values at the plurality of wavelengths each associated with the first surface area of the body of water, wherein each of the modeled light intensity values depends on a reflectance of an assumed bottom cover on a bottom below the first surface area and on an assumed depth between the first surface area and the bottom;
determining a plurality of differences between the modeled light intensity values on the one hand and the first and second light intensity values on the other hand for each of the plurality of wavelengths;
minimizing a sum of the plurality of differences by varying the assumed depth and the reflectance of the assumed bottom cover; and
displaying an estimated depth between the first surface area and the bottom, wherein the estimated depth is the assumed depth that results in the minimized sum of the plurality of differences, and wherein the estimated depth is displayed on a graphical user interface.

8. The method of claim 7, wherein the first light intensity values are taken from the group consisting of: radiance values, reflectance values and irradiance values.

9. The method of claim 7, wherein the assumed bottom cover is taken from the group consisting of: sand, sea grass, rock, bottom sediment, and coral reef.

10. The method of claim 7, wherein each of the modeled light intensity values depends on absorption by assumed water constituents between the first surface area and the bottom.

11. The method of claim 10, wherein the assumed water constituents are taken from the group consisting of: suspended inorganic matter, phytoplankton, macrophytes, and dissolved organic matter.

12. The method of claim 7, wherein the first surface area corresponds to a pixel of a satellite image of the body of water.

13. A system for determining water depth, comprising:
a satellite database containing first light intensity values acquired over a plurality of wavelengths and second light intensity values acquired over the plurality of wavelengths, wherein the first light intensity values are acquired at a first time, and the second light intensity values are acquired at a second time, and wherein the first and second light intensity values are all associated with a defined surface area of a body of water;
a data analysis server that calculates modeled light intensity values at the plurality of wavelengths, wherein each of the modeled light intensity values is associated with the defined surface area and depends on a reflectance by an assumed bottom cover on a bottom below the defined surface area and on an assumed depth between the defined surface area and the bottom, wherein for each of the plurality of wavelengths the data analysis server determines a plurality of differences between the modeled light intensity values on the one hand and the first and second light intensity values on the other hand and minimizes a sum of the plurality of differences by varying the assumed depth and the reflectance of the assumed bottom cover; and a graphical user interface on which an estimated depth between the defined surface area and the bottom is displayed, wherein the estimated depth is the assumed depth that results in the minimized sum of the plurality of differences.

14. The system of claim 13, wherein the sum of the plurality of differences is a sum of weighted differences that are weighted based on the corresponding wavelength.

15. The system of claim 13, wherein each of the modeled light intensity values depends on assumed water constituents between the first surface area and the bottom.

16. The system of claim 15, wherein the assumed water constituents are taken from the group consisting of: suspended matter, phytoplankton, detritus and gelbstoff.

17. The system of claim 13, wherein the defined surface area corresponds to a pixel of a satellite image of the body of water.

* * * * *